United States Patent
Lewandowski et al.

(10) Patent No.: US 10,300,899 B2
(45) Date of Patent: May 28, 2019

(54) ADJUSTMENT OF MAXIMUM BRAKE PUMP SPEED BASED ON RATE OF CHANGE OF TARGET DECELERATION

(71) Applicant: Ford Global Technologies, LLC, Dearborn, MI (US)

(72) Inventors: Andrew Denis Lewandowski, Sterling Heights, MI (US); Jason Christopher Matthews, Farmington Hills, MI (US); Charles Edward Uptain, Rochester Hills, MI (US); Shane Larkin, Berkley, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/400,620

(22) Filed: Jan. 6, 2017

(65) Prior Publication Data

US 2018/0194335 A1    Jul. 12, 2018

(51) Int. Cl.
*B60T 8/40* (2006.01)
*B60T 17/02* (2006.01)
(Continued)

(52) U.S. Cl.
CPC .......... *B60T 8/4059* (2013.01); *B60T 7/042* (2013.01); *B60T 7/22* (2013.01); *B60T 13/18* (2013.01); *B60T 13/662* (2013.01); *B60T 17/02* (2013.01)

(58) Field of Classification Search
CPC ........ B60T 8/4059; B60T 7/22; B60T 8/4054; B60T 17/02; B60T 7/12; B60T 8/404;
(Continued)

(56) References Cited

U.S. PATENT DOCUMENTS 3,857,612 A    12/1974    Bynum
5,575,542 A  * 11/1996    Tanaka ................... B60T 7/12
                                                           180/167
(Continued)

FOREIGN PATENT DOCUMENTS

DE    102012215790 A1    3/2014
DE    102013007543 A     11/2014
(Continued)

OTHER PUBLICATIONS

EPO machine translation of DE 102013007543 (original DE document published Nov. 6, 2014) (Year: 2014).*
(Continued)

*Primary Examiner* — Behrang Badii
*Assistant Examiner* — David A Testardi
(74) *Attorney, Agent, or Firm* — Frank Lollo; James P. Muraff; Neal, Gerber & Eisenberg LLP

(57) ABSTRACT

Method and apparatus are disclosed for adjustment of maximum brake pump speed based on rate of change of target deceleration. An example vehicle includes a brake pump having a maximum pump speed. The example vehicle also includes a vehicle decelerator to determine a target deceleration for autonomous deceleration and send a signal to the brake pump to decelerate the vehicle at the target deceleration. The example vehicle also includes a maximum speed regulator to determine a rate of change of the target deceleration and adjust the maximum pump speed based on the rate of change.

14 Claims, 7 Drawing Sheets

(51) Int. Cl.
  *B60T 7/22* (2006.01)
  *B60T 7/04* (2006.01)
  *B60T 13/18* (2006.01)
  *B60T 13/66* (2006.01)

(58) Field of Classification Search
  CPC .......... B60T 8/405; B60T 7/042; B60T 13/18; B60T 13/662
  See application file for complete search history.

(56) References Cited

U.S. PATENT DOCUMENTS

| | | | |
|---|---|---|---|
| 5,959,572 A * | 9/1999 | Higashimata | G08G 1/166 340/903 |
| 6,056,374 A * | 5/2000 | Hiwatashi | B60K 31/0008 180/169 |
| 6,161,073 A * | 12/2000 | Tange | B60K 31/0008 340/435 |
| 6,188,947 B1 * | 2/2001 | Zhan | B60T 8/4059 303/11 |
| 6,304,808 B1 | 10/2001 | Milot | |
| 6,595,598 B2 | 7/2003 | Harris | |
| 7,021,725 B2 | 4/2006 | Kokubo | |
| 7,568,773 B2 | 8/2009 | Nomura | |
| 8,544,962 B2 | 10/2013 | Ganzel | |
| 8,731,756 B2 | 5/2014 | Krueger et al. | |
| 8,868,311 B2 | 10/2014 | Schwindt | |
| 9,096,200 B2 | 8/2015 | Zeoli | |
| 9,221,443 B2 | 12/2015 | Ganzel | |
| 10,106,137 B2 * | 10/2018 | Lewandowski | B60T 7/042 701/70 |
| 2002/0038977 A1 | 4/2002 | Nitta | |
| 2002/0180262 A1 * | 12/2002 | Hara | B60T 8/17616 303/119.1 |
| 2005/0110343 A1 * | 5/2005 | Gronau | B60T 8/442 303/116.2 |
| 2006/0149455 A1 * | 7/2006 | Sawada | B60T 7/22 701/96 |
| 2007/0188015 A1 * | 8/2007 | Sato | B60T 8/4059 303/11 |
| 2007/0188017 A1 * | 8/2007 | Niino | B60T 8/405 303/113.2 |
| 2007/0205658 A1 * | 9/2007 | Sato | B60T 7/042 303/10 |
| 2007/0276574 A1 * | 11/2007 | Isaji | B60T 7/22 701/70 |
| 2008/0284242 A1 | 11/2008 | Ganzel | |
| 2011/0077832 A1 * | 3/2011 | Niino | B60T 7/042 701/70 |
| 2011/0166762 A1 * | 7/2011 | Bunk | B60T 8/1755 701/70 |
| 2012/0112524 A1 | 5/2012 | Shibata et al. | |
| 2013/0062934 A1 | 3/2013 | Daher | |
| 2014/0000740 A1 | 1/2014 | Wald | |
| 2014/0100755 A1 | 4/2014 | Schwindt | |
| 2015/0106007 A1 * | 4/2015 | Matsumura | B60W 30/143 701/408 |
| 2015/0224845 A1 | 8/2015 | Anderson | |
| 2015/0283985 A1 * | 10/2015 | Korthals | B60T 7/22 701/70 |
| 2018/0194336 A1 * | 7/2018 | Lewandowski | B60T 7/042 |

FOREIGN PATENT DOCUMENTS

| | | | |
|---|---|---|---|
| EP | 089081 A1 * | 9/1983 | |
| EP | 1564409 A2 * | 8/2005 | ............ B60T 8/4059 |
| JP | 2001260833 A * | 9/2001 | |
| JP | 2009096211 A * | 5/2009 | |
| WO | WO 03031244 A1 | 4/2003 | |
| WO | WO 2014105665 A1 | 7/2014 | |

OTHER PUBLICATIONS

Search Report dated Jul. 31, 2018 for GB Patent Application No. GB 1800133.9 (4 Pages).
Search Report dated Jul. 31, 2018 for GB Patent Application No. GB 1800130.5 (4 Pages).

* cited by examiner

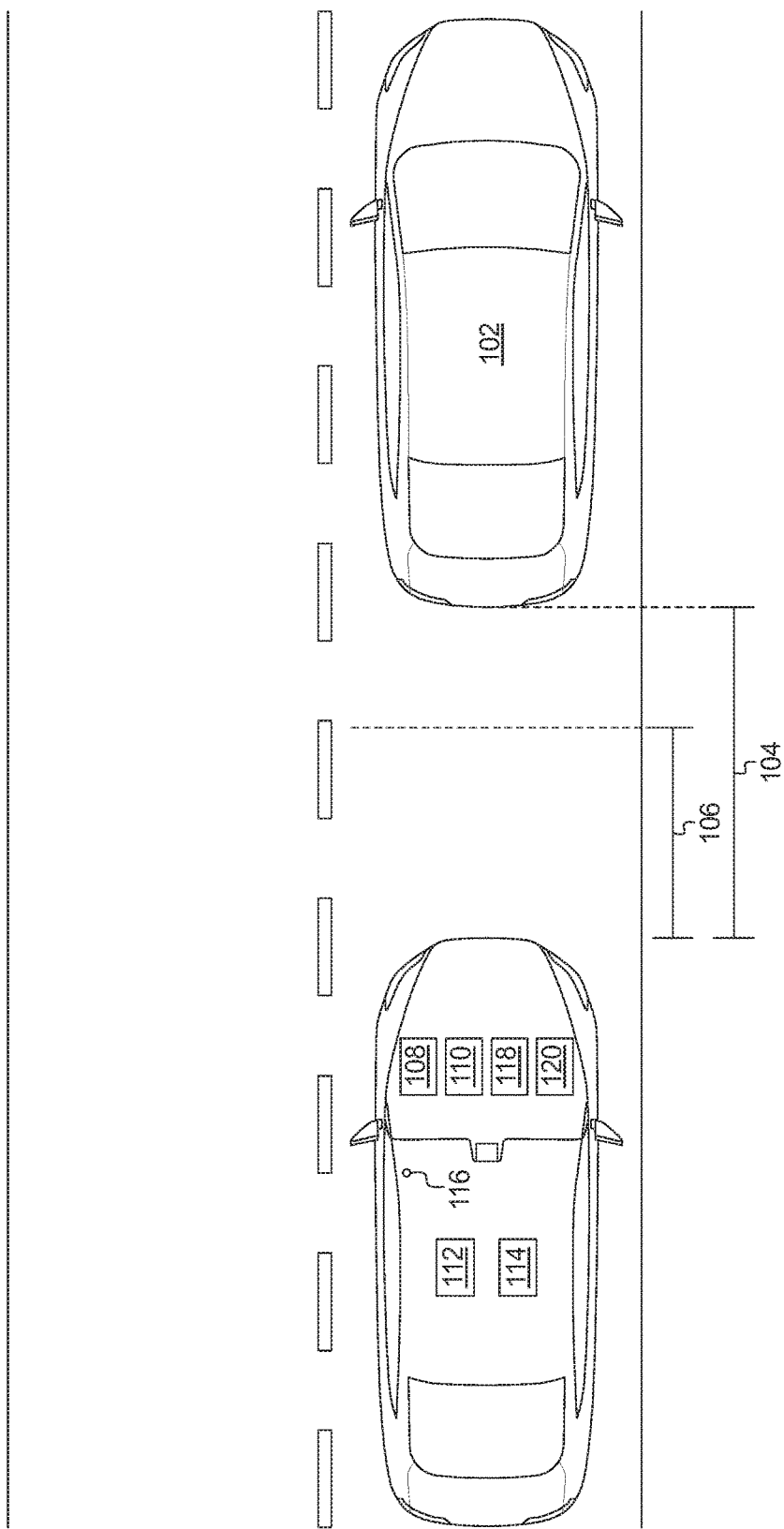

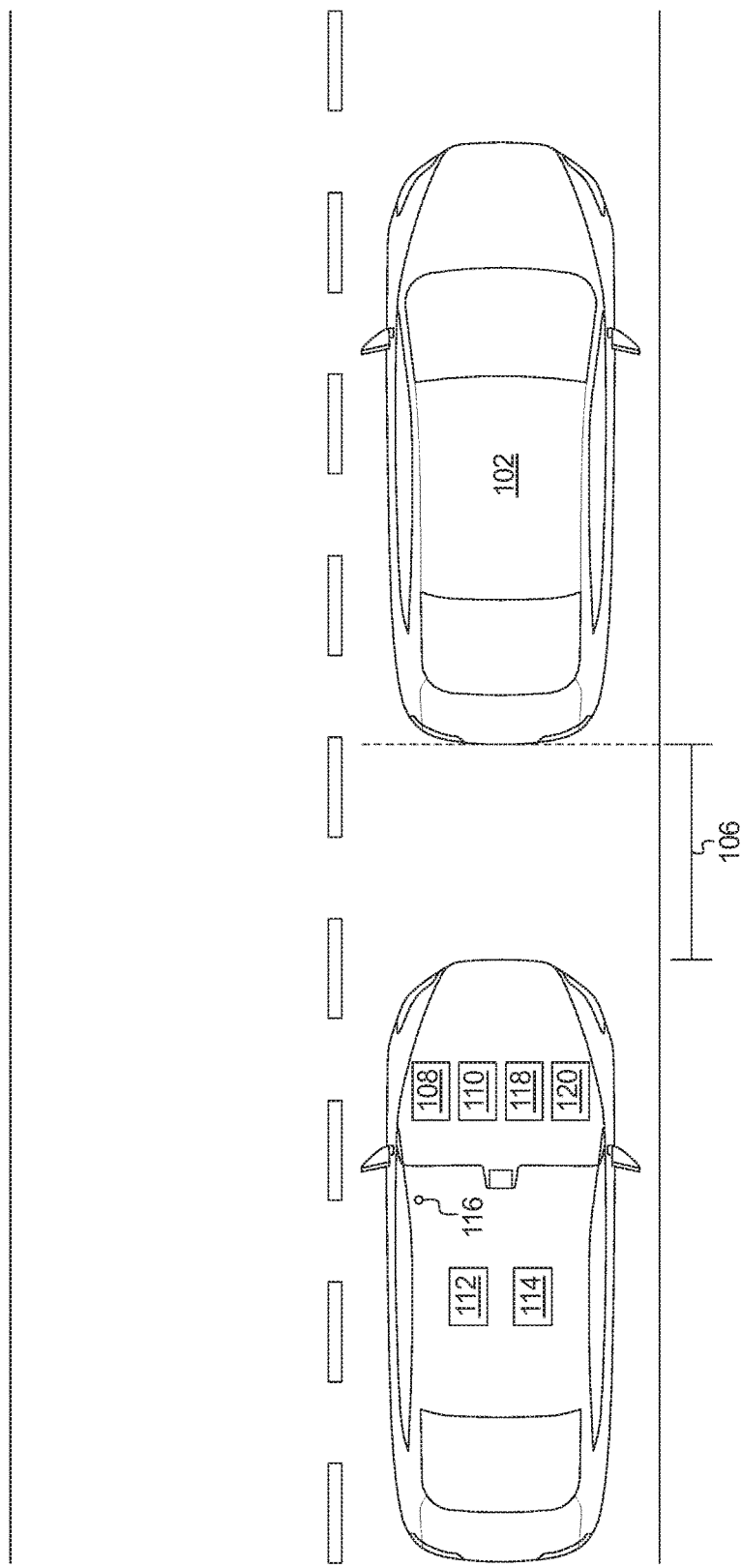

ADJUSTMENT OF MAXIMUM BRAKE PUMP SPEED BASED ON RATE OF CHANGE OF TARGET DECELERATION

CROSS-REFERENCE TO RELATED APPLICATION

This application is related to U.S. application Ser. No. 15/400,626 filed on Jan. 6, 2017, which is incorporated herein by reference in its entirety.

TECHNICAL FIELD

The present disclosure generally relates to brake pumps and, more specifically, adjustment of maximum brake pump speed based on rate of change of target deceleration.

BACKGROUND

Typically, a vehicle includes a braking system to slow down or decelerate the vehicle. Some braking systems include a brake pedal, a brake cylinder, brake lines, and wheel brakes. In such examples, the brake cylinder generates hydraulic pressure when a driver presses the brake pedal. The hydraulic pressure is supplied to the wheel brakes via the brake lines. The wheel brakes subsequently engage wheels of the vehicle to limit and/or deter rotation of the wheels and, thus, to stop and/or otherwise decelerate the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for adjustment of maximum brake pump speed based on rate of change of target deceleration. An example disclosed vehicle includes a brake pump having a maximum pump speed. The example disclosed vehicle also includes a vehicle decelerator to determine a target deceleration for autonomous deceleration and send a signal to the brake pump to decelerate the vehicle at the target deceleration. The example disclosed vehicle also includes a maximum speed regulator to determine a rate of change of the target deceleration and adjust the maximum pump speed based on the rate of change.

An example disclosed method for autonomous deceleration of a vehicle includes determining, via a processor, a target deceleration for a vehicle and sending a signal to a brake pump to decelerate the vehicle at the target deceleration. The brake pump has a maximum pump speed. The example disclosed method also includes determining a rate of change of the target deceleration and adjusting the maximum pump speed based on the rate of change.

An example disclosed tangible computer readable storage medium includes instructions which, when executed, cause a vehicle to determine, via a processor, a target deceleration for autonomous deceleration of a vehicle and send a signal to a brake pump to decelerate the vehicle at the target deceleration. The brake pump has a maximum pump speed. The instructions which, when executed, also cause the vehicle to determine a rate of change of the target deceleration and adjust the maximum pump speed based on the rate of change.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 1A illustrates an example vehicle in accordance with the teachings herein spaced apart from an object by a first distance.

FIG. 1B illustrates the vehicle of FIG. 1A spaced apart from the object by a second distance.

DETAILED DESCRIPTION OF EXAMPLE EMBODIMENTS

Figure 2:
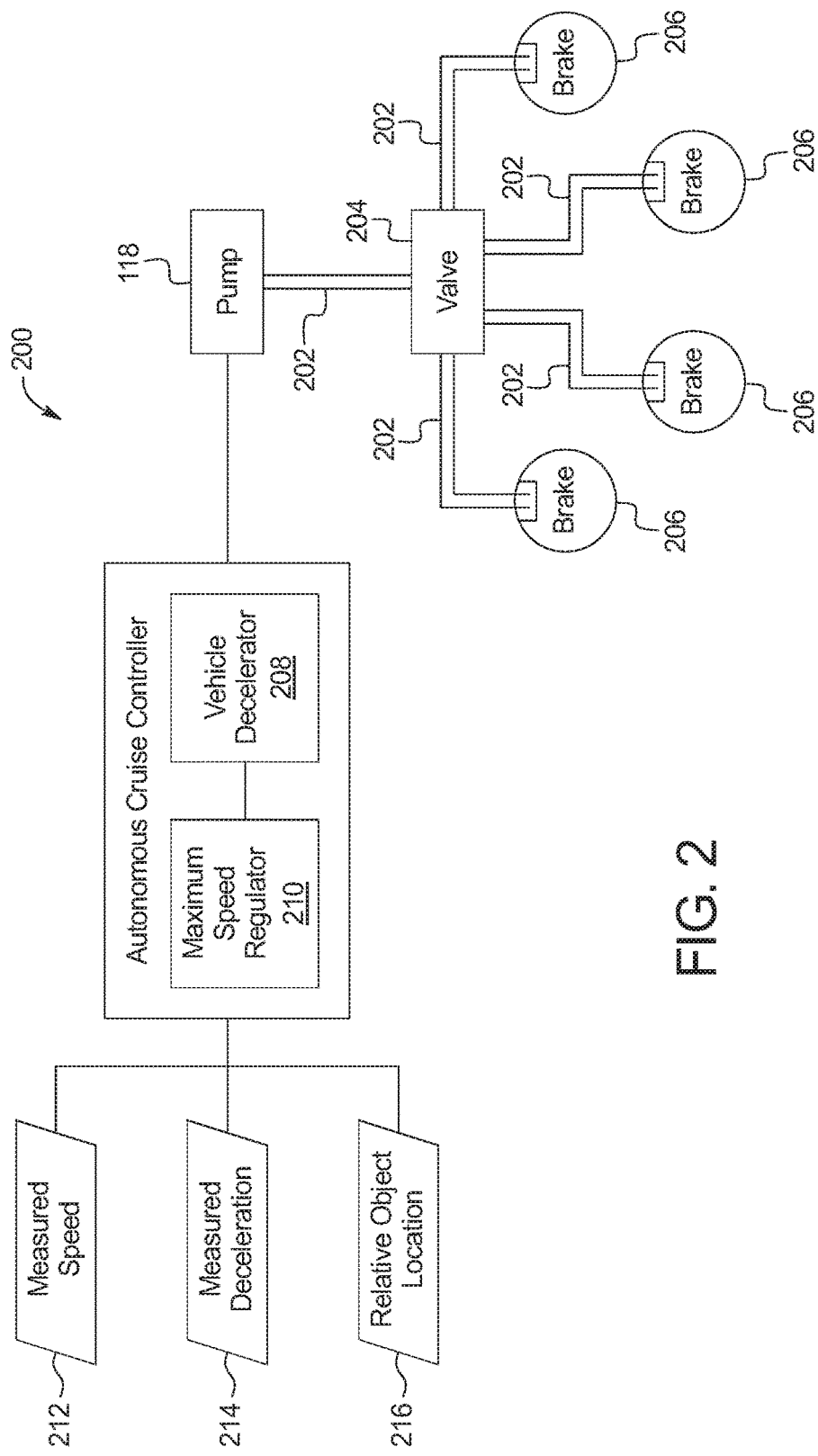
FIG. 2 is a block diagram of an autonomous cruise controller and a brake system of the vehicle of FIGS. 1A-1B.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Generally, a vehicle includes a braking system to stop, slow down and/or otherwise decelerate the vehicle. Some braking systems include a brake pedal, a brake cylinder, brake lines, and wheel brakes (e.g., disc brakes, drum brakes, etc.). For example, the braking system may include a wheel brake for each respective wheel of the vehicle. To decelerate the vehicle, the brake cylinder of such brake systems generates hydraulic pressure when a driver presses the brake pedal. Subsequently, the hydraulic pressure is supplied to the wheel brakes via the brake lines, which causes the wheel brakes to engage the wheels of the vehicle to limit and/or deter rotation of the wheels. As a result, the brake system causes the vehicle to stop, slow down, and/or otherwise decelerate the vehicle.

Typically, the brake pump has a maximum operational speed that limits a speed at which the brake pump operates. That is, the brake pump may operate at or below, but may not operate above, the maximum operational speed to generate the hydraulic pressure. Upon receiving the signal from the ACC system/vehicle decelerator to decelerate the vehicle, some brake pumps temporarily surge to the maximum operational speed of the brake pump. Subsequently, the current drawn by the brake pump may reduce over time to produce a desired rate of deceleration associated with the signal from the ACC system/vehicle decelerator. The maximum operational speed typically is set prior to and/or at the time the brake pump is installed in a vehicle. In some instances, if the maximum operational speed is set at a relatively low value, the maximum operational speed may potentially prevent the vehicle from decelerating at a high rate of deceleration and/or increases an amount of time it takes for the brake pump to produce the high rate of deceleration. In other instances, if the maximum operational speed is set at a relatively high value, the maximum operational speed may potentially cause the vehicle to jerk upon application of the ACC-commanded deceleration and/or produce a noise, vibration, and harshness (NVH) that are heard by occupants of the vehicle when the brake pump surges to the maximum operational speed.

Example methods, apparatus, and computer readable media disclosed herein adjusts a maximum speed of a brake pump of a vehicle while the vehicle is in operation. The maximum speed of the brake pump is adjusted during operation of an adaptive cruise control system of the vehicle based on a rate of change of a target deceleration and/or a difference between the target deceleration and a measured deceleration to enable the brake pump to produce higher rates of deceleration and to produce lower rates of deceleration with reduced jerking and/or a reduced NVH level heard by occupant(s) in a cabin of the vehicle.

Examples disclosed herein include a brake pump of a brake system that enables braking for a vehicle. The brake pump has a maximum pump speed that is adjustable. A vehicle decelerator determines a target deceleration for autonomous deceleration and sends a signal to the brake pump to decelerate the vehicle at the target deceleration. Further, a maximum speed regulator is to adjust the maximum pump speed of the brake pump.

As used herein, a "maximum pump speed," a "maximum brake pump speed," and a "maximum speed of a brake pump" refer to an adjustable setting of a brake pump that limits a speed of operation of the brake pump. For example, upon receiving a signal to initiate braking of the vehicle, the brake pump surges to, but does not surpass, the maximum pump speed. Further, the maximum pump speed of a brake pump is limited by a physical speed cap of a brake pump. As used herein, a "pump speed upper limit," and a "brake pump upper limit" refer to a highest pump speed at which a brake pump is physically able to operate.

As used herein, a "target deceleration" refers to a deceleration value at which the vehicle is intended to decelerate. As used herein, "autonomous deceleration" refers to deceleration that is initiated by an autonomous system (e.g., e.g., a system in which motive functions are controlled by a vehicle without direct driver input) or a semi-autonomous system (e.g., a system in which some routine motive functions are controlled by a vehicle). For example, autonomous deceleration may be initiated via autonomous cruise control. As used herein, "cruise control" and "cruise control system" refer to a vehicle system that autonomously maintains a speed at which a vehicle is traveling. As used herein, "autonomous cruise control," "adaptive cruise control," an "autonomous cruise control system" and an "adaptive cruise control system" refer to a cruise control system that also autonomously adjusts a speed at which a vehicle is traveling to maintain a safe distance between the vehicle and a detected object (e.g., another vehicle).

In examples disclosed herein, the maximum speed regulator determines a rate of change of the target deceleration over time and adjusts the maximum pump speed based on the rate of change. The rate of change of the target deceleration may increase if the vehicle is rapidly approaching another object and/or the maximum pump speed is set at too low of a value. Conversely, the rate of change of the target deceleration may decrease if the vehicle is slowly approaching the other object and/or the maximum pump speed is set at too high of a value.

In some such examples, the maximum speed regulator increases the maximum pump speed in response to determining that the rate of change is greater than a predetermined threshold (e.g., a first threshold), decreases the maximum pump speed in response to determining that the rate of change is less than another predetermined threshold (e.g., a second threshold), and/or otherwise maintains the maximum pump speed (e.g., a default maximum pump speed). For example, the maximum speed regulator increases the maximum pump speed by a predetermined value (e.g., a first value) based on a difference between the rate of change and the first threshold and/or decreases the maximum pump speed by another predetermined value (e.g., a second value) based on a difference between the rate of change and the second threshold. In other such examples, the maximum speed regulator increases the maximum pump speed in response to detecting an increase of the rate of change of the target deceleration, decreases the maximum pump speed in response to detecting a decrease of the rate of change of the target deceleration, and/or otherwise maintains the maximum pump speed.

In other examples disclosed herein, a sensor of the vehicle (e.g., a first sensor such as an accelerometer or a vehicle speed sensor) detects a measured deceleration, and the maximum speed regulator adjusts the maximum speed pump based on a difference between the target deceleration and the measured deceleration. As used herein, a "measured deceleration" refers to a deceleration at which a vehicle is measured (e.g., via an accelerometer and/or a vehicle speed sensor) to be decelerating. The measured deceleration may be less than the target deceleration if the vehicle is rapidly approaching another object and/or the maximum pump speed is set at too low of a value. Conversely, the measured deceleration may greater than the target deceleration if the vehicle is slowly approaching another object and/or the maximum pump speed is set at too high of a value.

In some such examples, the maximum speed regulator increases the maximum pump speed in response to determining that the measured deceleration is less than the target deceleration, decreases the maximum pump speed in response to determining that the measured deceleration is greater than the target deceleration, and/or otherwise maintains the maximum pump speed (e.g., a default maximum pump speed). For example, the maximum speed regulator increases the maximum pump speed by a predetermined value (e.g., a first value) and/or decreases the maximum pump speed by another predetermined value (e.g., a second value) based on the difference between the measured deceleration and the target deceleration. In other such examples, the maximum speed regulator increases the maximum pump speed in response to determining that the measured deceleration is less than the target deceleration by at least a predetermined threshold (e.g., a first threshold), decreases the maximum pump speed in response to determining that the measured deceleration is greater than the target deceleration by at least another predetermined threshold (e.g., a first threshold), and/or otherwise maintains the maximum pump speed.

In examples disclosed herein, the vehicle includes a sensor (e.g., a second sensor such as a lidar sensor, a radar sensor, an ultrasonic sensor, a camera, etc.) that is to detect an object (e.g., another vehicle) in front of the vehicle. In such examples, the vehicle decelerator sends the signal to the brake pump to maintain a buffer distance between the vehicle and the object. As used herein, a "buffer distance" refers to distance at which a vehicle safely travels behind an object (e.g., another vehicle). For example, the vehicle decelerator determines the buffer distance based on structural characteristics of the vehicle (e.g., size, weight, etc.), a velocity of the vehicle, an acceleration of the vehicle, a velocity of the other object, an acceleration of the other object, and/or current weather conditions. Additionally or alternatively, the vehicle decelerator determines the target deceleration based on the structural characteristics of the vehicle (e.g., size, weight, etc.), the velocity of the vehicle, the acceleration of the vehicle, the velocity of the other object, the acceleration of the other object, and/or the current weather conditions. In some examples, the vehicle decelerator determines the relative velocity between the vehicle and the object via the second sensor. In some examples, the vehicle includes a vehicle speed sensor to determine a speed and/or an acceleration of the vehicle.

Turning to the figures, FIGS. 1A and 1B illustrate an example vehicle 100 in accordance with the teachings herein. More specifically, FIG. 1A depicts the vehicle 100 (e.g., a first vehicle) spaced apart from an object 102 (e.g., another vehicle, a second vehicle) by a first distance 104 greater than a buffer distance 106, and FIG. 1B depicts the vehicle 100 spaced apart from the object 102 by the buffer distance 106.

The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes a sensor 108, a camera 110, an accelerometer 112, a vehicle speed sensor 114, a cruise control switch 116, a brake pump 118, and an autonomous cruise controller 120.

In the illustrated example, the sensor 108 detects when the object 102 is in front of the vehicle 100 and collects data that enables the autonomous cruise controller 120 (e.g., a vehicle decelerator 208 of FIG. 2 of the autonomous cruise controller 120) to determine a distance and/or a relative velocity between the vehicle 100 and the object 102 (e.g., the first distance 104 of FIG. 1A, the buffer distance 106 of FIG. 1B).

The sensor 108 is a lidar sensor, a radar sensor, an ultrasonic sensor, and/or any other type of sensor that is able to detect an object in front of the vehicle 100 and collect information to enable the autonomous cruise controller 120 to determine the distance and/or the relative velocity between the vehicle 100 and the object 102. Additionally or alternatively, the camera 110 of the vehicle 100 detects when the object 102 is in front of the vehicle 100 and collects data to enable the autonomous cruise controller 120 to determine the distance and/or the relative velocity between the vehicle 100 and the object 102.

In the illustrated example, the accelerometer 112 measures or detects an acceleration and/or deceleration of the vehicle 100. For example, the accelerometer 112 detects or measures a measured deceleration of the vehicle 100 upon the autonomous cruise controller 120 instructing a brake system (e.g., a brake system 200 of FIG. 2) to decelerate the vehicle 100 at a target deceleration. Further, the vehicle speed sensor 114 measures or detects a velocity of the vehicle 100. In some examples, the velocity measured or detected by the vehicle speed sensor 114 is utilized to determine an acceleration and/or deceleration (e.g., the measured deceleration) of the vehicle 100.

The cruise control switch 116 of the illustrated example enables a driver of the vehicle 100 to activate and/or deactivate a cruise control system (e.g., an adaptive cruise control system) of the vehicle 100. For example, the cruise control switch 116 is a pushbutton, a toggle, and/or any other type of switch that the driver may operate to turn on and/or turn off the adaptive cruise control system of the vehicle 100.

Additionally, the brake pump 118 generates or produces hydraulic pressure and provides the hydraulic pressure to wheel brakes (e.g., wheel brakes 206 of FIG. 2) to cause the vehicle 100 to decelerate. For example, when the adaptive cruise control system of the vehicle 100 is operating and the sensor 108 and/or the camera 110 detects the object 102, the brake pump 118 receives a signal from the autonomous cruise controller 120 to decelerate the vehicle 100 at a target deceleration. Additionally or alternatively, the brake pump 118 may receive a signal from a brake pedal when the driver is operating the vehicle manually and/or semi-autonomously.

Further, the brake pump 118 has a maximum pump speed that is adjustable. The maximum pump speed limits a speed of operation of the brake pump 118 as the brake pump 118 generate hydraulic power and, thus, may affect the deceleration of the vehicle 100 resulting from operation of the brake pump 118. The brake pump 118 also has a pump speed upper limit that is based on physical and/or structural characteristics of the brake pump 118 and components thereof. The pump speed upper limit defines a highest potential value of the maximum pump speed (i.e., the maximum pump speed cannot exceed the pump speed upper limit) and, thus, may affect the deceleration of the vehicle 100 resulting from operation of the brake pump 118.

The autonomous cruise controller 120 of the illustrated example operates an adaptive cruise control system of the vehicle 100. For example, the autonomous cruise controller 120 autonomously maintains a speed at which the vehicle 100 is traveling and/or adjusts a speed at which the vehicle 100 is traveling to maintain a safe distance (e.g., the buffer distance 106) between the vehicle 100 and a detected object (e.g., the object 102). When the sensor 108 and/or the camera 110 detects the object 102 in front of the vehicle 100, the autonomous cruise controller 120 autonomously decelerates the vehicle 100 to maintain the buffer distance 106 between the vehicle 100 and the object 102 by instructing the brake pump 118 to decelerate the vehicle 100 at a target deceleration.

For example, if the vehicle 100 is approaching the object 102 and is spaced apart from the object 102 by the first distance 104 that is greater than the buffer distance 106 (FIG. 1A), the autonomous cruise controller 120 determines a target deceleration that will enable the vehicle 100 to be spaced apart from the object 102 by at least the buffer distance 106 (FIG. 1B). If the distance between the vehicle 100 and the object 102 is less than the buffer distance 106, the autonomous cruise controller 120 will determine a target deceleration that will quickly cause the vehicle 100 to be spaced apart from the object 102 by at least the buffer distance 106 (FIG. 1B).

FIG. 2 is a block diagram the autonomous cruise controller 120 and a brake system 200 of the vehicle 100. As illustrated in FIG. 2, the brake system 200 includes the brake pump 118, brake lines 202, a brake line valve 204, and wheel brakes 206 (e.g., disc brakes, drum brakes, etc.). Further, the autonomous cruise controller 120 includes a vehicle decelerator 208 that sends a signal to the brake system 200 to decelerate the vehicle 100 and a maximum speed regulator that adjusts a maximum pump speed of the vehicle 100.

In operation, the brake pump 118 receives a signal from the autonomous cruise controller 120 to decelerate the vehicle 100. For example, the brake pump 118 receives a signal to decelerate the vehicle at a target deceleration. Based on the target deceleration, the brake pump 118 generates or produces hydraulic pressure that is provides to the wheel brakes 206 via the brake lines 202 and the brake line valve 204. In the illustrated example, a portion of the brake lines 202 fluidly connect the brake pump 118 and the brake line valve 204, and other portions of the brake lines 202 fluidly connect the brake pump 118 to the respective wheel brakes 206. Upon receiving the hydraulic pressure, each of the wheel brakes 206 engage a corresponding wheel of the vehicle 100 to reduce rotation of the wheels to decelerate the vehicle 100. In the illustrated example, the brake system 200 includes four wheel brakes 206 that each interact with a different wheel of a four-wheel vehicle. In other examples, the brake system 200 may include more or less of the wheel brakes 206 for vehicles having more, less, or the same number of wheels.

In the illustrated example, the vehicle decelerator 208 of the autonomous cruise controller 120 determines the target deceleration for autonomous deceleration of the vehicle 100. Further, the vehicle decelerator 208 sends the signal to the brake pump 118 of the brake system 200. The signal instructs the brake pump 118 to generate a hydraulic pressure that is to cause the wheel brakes 206 to decelerate the vehicle 100 at the target deceleration. The target deceleration determined by the vehicle decelerator 208 is to enable the vehicle 100 to be spaced apart from the object 102 by at least the buffer distance 106 (e.g., to maintain the buffer distance 106 between the vehicle 100 and the object 102).

In some examples, the vehicle decelerator 208 determines the buffer distance 106 based on a measured speed 212 of the vehicle 100, a measured deceleration (or acceleration) 214 of the vehicle 100, structural characteristics of the vehicle 100 (e.g., size, weight, etc.), a speed of the object 102, a deceleration or acceleration of the object 102, and/or current weather conditions. Additionally or alternatively, the vehicle decelerator 208 determines the target deceleration based on the measured speed 212 of the vehicle 100, the measured deceleration 214 of the vehicle 100, a relative velocity between the vehicle 100 and the object 102, a distance between the vehicle 100 and the object 102 and/or current weather conditions.

For example, the vehicle decelerator 208 of the autonomous cruise controller 120 collects the measured speed 212 from the vehicle speed sensor 114 of the vehicle 100. The vehicle decelerator 208 collects the measured deceleration 214 from the accelerometer 112 and/or determines the measured deceleration 214 based on the measured speed 212. The vehicle decelerator 208 determines the distance (e.g., the first distance 104) between the vehicle 100 and the object 102 based on a relative object location 216 of the object 102 relative to the vehicle 100. For example, the vehicle decelerator 208 collects the relative object location 216 from the sensor 108 and/or the camera 110 of the vehicle 100. Further, the vehicle decelerator 208 determines the speed, deceleration or acceleration, and/or relative velocity of the object 102 based on the measured speed 212, the measured deceleration 214, and/or the relative object location 216.

Further, the maximum speed regulator 210 of the autonomous cruise controller 120 adjusts the maximum pump speed of the brake pump 118. For example, the maximum speed regulator 210 sends a signal to the brake pump 118 to adjust the maximum pump speed of the brake pump 118. In some examples, the maximum speed regulator 210 increases the maximum pump speed to enable the brake pump 118 to generate an increased hydraulic pressure to enable the brake system 200 to increase deceleration of the vehicle 100 and/or to decrease an amount of time needed for the brake system 200 to produce the target deceleration. In other examples in which the maximum pump speed of the brake pump 118 enables the vehicle 100 to decelerate at the target deceleration, the maximum speed regulator 210 decreases the maximum pump speed to reduce jerking resulting from abrupt deceleration of the vehicle and/or to reduce NVH levels produced by the brake pump 118. The vehicle 100 may potentially otherwise jerk and/or result in high NVH levels heard by occupant(s) within a cabin of the vehicle 100 as a result of the brake pump 118 surging to the maximum pump speed upon receiving a signal from the vehicle decelerator 208 to decelerate the vehicle 100 at the target deceleration. For example, the maximum speed regulator 210 reduces NVH levels heard by occupant(s) within a cabin when the vehicle 100 is traveling at a low rate of speed and the brake pump 118 surges to the maximum pump speed.

In some examples, the maximum speed regulator 210 adjusts the maximum pump speed based on a rate of change of the target deceleration over time. For example, the maximum speed regulator 210 determines a first target deceleration at a first point-in-time, determines a second target deceleration at a second point-in-time different than the first point-in-time, determines the rate of change between the first target deceleration and the second target deceleration, and determines whether to adjust the maximum pump speed based on the rate of change. The target deceleration may change based on changes over time to the measured speed 212, the measured deceleration 214, the relative object location 216, etc.

The rate of change of the target deceleration may increase if the vehicle 100 is rapidly approaching the object 102 and/or the maximum pump speed of the brake pump 118 is set at too low of a value. In such examples, the maximum speed regulator 210 increases the maximum pump speed of the brake pump 118 in response to detecting an increase of the rate of change of the target deceleration to enable the brake pump 118 to generate an increased hydraulic pressure associated with a greater target deceleration and/or to decrease an amount of time needed to produce the target deceleration. For example, the maximum speed regulator 210 increases the maximum pump speed by a predetermined value (e.g., a first value) based on the rate at which the target deceleration increases.

Conversely, the rate of change of the target deceleration may decrease if the vehicle 100 is slowly approaching the object 102 and/or the maximum pump speed is set at too high of a value. In such examples, the maximum speed regulator 210 decreases the maximum pump speed of the brake pump 118 in response to detecting a decrease of the rate of change of the target deceleration to reduce jerking of the vehicle 100 resulting from abrupt deceleration of the vehicle 100 and/or to reduce an NVH level resulting from the brake pump 118 operating at or near the maximum pump speed. For example, the maximum speed regulator 210 decreases the maximum pump speed by a predetermined value (e.g., a second value) based on the rate at which the target deceleration decreases.

In some examples in which the maximum speed regulator 210 adjusts the maximum pump speed based on the rate of change of the target deceleration, the maximum speed regulator 210 increases the maximum pump speed in response to determining that the rate of change is greater than a predetermined threshold (e.g., a first threshold). Further, the maximum speed regulator 210 decreases the maximum pump speed in response to determining that the rate of change is less than another predetermined threshold (e.g., a second threshold). For example, the maximum speed regulator 210 increases the maximum pump speed by a predetermined value (e.g., a first value) based on a difference between the rate of change and the first threshold and decreases the maximum pump speed by another predetermined value (e.g., a second value) based on a difference between the rate of change and the second threshold. Further, the maximum speed regulator 210 maintains the maximum pump speed if the rate of change is between the first threshold and the second threshold.

In other examples, the maximum speed regulator 210 adjusts the maximum pump speed based on difference between the target deceleration and the measured deceleration 214. For example, the maximum speed regulator 210 adjusts the maximum pump speed if the target deceleration is greater than the measured deceleration 214 (e.g., by a predetermined threshold) and/or if the measured deceleration 214 is greater than the target deceleration (e.g., by a predetermined threshold).

The target deceleration may be greater than the measured deceleration 214 if the vehicle 100 is rapidly approaching the object 102 and/or the maximum pump speed of the brake pump 118 is set at too low of a value. In such examples, the maximum speed regulator 210 increases the maximum pump speed of the brake pump 118 in response to detecting that the measured deceleration 214 is less than the target deceleration to generate an increased hydraulic pressure associated with a greater target deceleration and/or to decrease an amount of time needed to produce the target deceleration. For example, the maximum speed regulator 210 increases the maximum pump speed by a predetermined value (e.g., a first value) based on the difference between the measured deceleration 214 and the target deceleration.

Conversely, the measured deceleration 214 may be greater than the target deceleration if the vehicle 100 is slowly approaching the object 102 and/or the maximum pump speed is set at too high of a value. In such examples, the maximum speed regulator 210 decreases the maximum pump speed of the brake pump 118 in response to detecting the measured deceleration 214 is less than the target deceleration to reduce jerking and/or to reduce an NVH level. For example, the maximum speed regulator 210 decreases the maximum pump speed by a predetermined value (e.g., a second value) based on the difference between the measured deceleration 214 and the target deceleration.

Further, in some examples in which the maximum speed regulator 210 adjusts the maximum pump speed based on a difference between the measured deceleration 214 and the target deceleration, the maximum speed regulator 210 increases the maximum pump speed in response to determining that the measured deceleration 214 is less than the target deceleration by at least a predetermined threshold (e.g., a first threshold). Further, the maximum speed regulator 210 decreases the maximum pump speed in response to determining that the measured deceleration 214 is greater than the target deceleration by at least another predetermined threshold (e.g., a second threshold). For example, the maximum speed regulator 210 increases the maximum pump speed by a predetermined value (e.g., a first value) based on a difference between the first threshold and the difference between measured deceleration 214 and the target deceleration. The maximum speed regulator 210 decreases the maximum pump speed by another predetermined value (e.g., a second value) based on a difference between the second threshold and the difference between the measured deceleration 214 and the target deceleration. Further, the maximum speed regulator 210 maintains the maximum pump speed if the difference between the measured deceleration 214 and the target deceleration is between the first threshold and the second threshold.

In the illustrated example, the maximum speed regulator 210 adjusts the maximum pump speed of the brake pump 118 when the vehicle 100 is being controlled via an adaptive cruise control system. In other examples, the maximum speed regulator 210 may adjust the maximum pump speed of the brake pump 118 when the vehicle 100 is not being controlled via an adaptive cruise control system (e.g., the vehicle 100 is being controlled manually and/or semi-autonomously by the driver). In such examples, the maximum speed regulator 210 that adjusts the maximum pump speed of the brake pump 118 may be external to the autonomous cruise controller 120.

Figure 3:
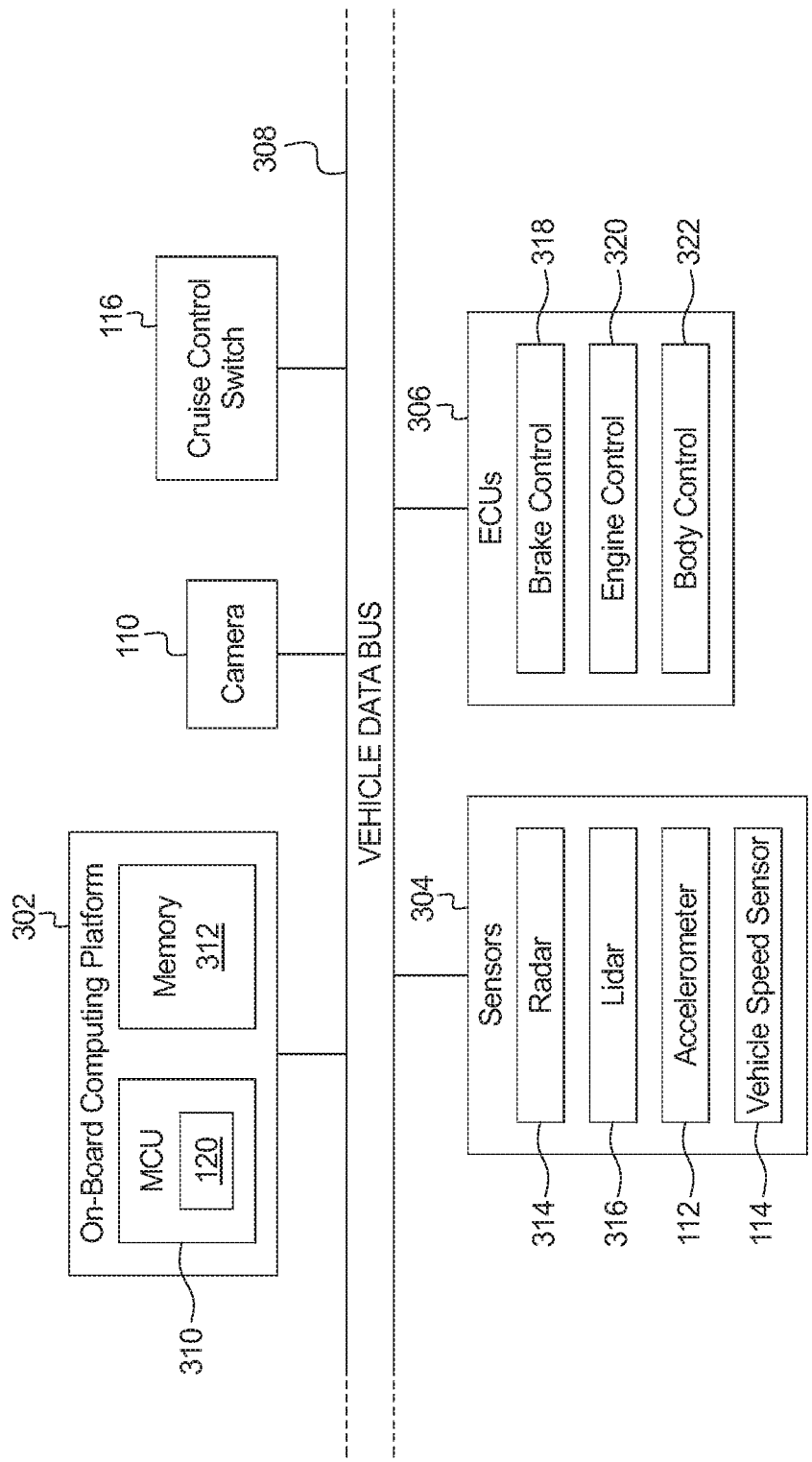
FIG. 3 is a block diagram of electronic components of the vehicle of FIGS. 1A-1B.

FIG. 3 is a block diagram of electronic components 300 of the vehicle 100. As illustrated in FIG. 3, the electronic components 300 includes an on-board computing platform 302, the camera 110, the cruise control switch 116, sensors 304, electronic control units (ECUs) 306, and a vehicle data bus 308.

The on-board computing platform 302 includes a microcontroller unit, controller or processor 310 and memory 312. In some examples, the processor 310 of the on-board computing platform 302 is structured to include the vehicle decelerator 208, the maximum speed regulator 210 and/or, more generally, the autonomous cruise controller 120. Alternatively, in some examples, the vehicle decelerator 208, the maximum speed regulator 210 and/or, more generally, the autonomous cruise controller 120 are incorporated into another electronic control unit (ECU) (e.g., a brake control module 218, a brake pump module, etc.) with its own processor 310 and memory 312. The processor 310 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 312 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 312 includes multiple kinds of memory, particularly volatile memory and non-volatile memory.

The memory 312 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 312, the computer readable medium, and/or within the processor 310 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 304 are arranged in and around the vehicle 100 to monitor properties of the vehicle 100 and/or an environment in which the vehicle 100 is located. One or more of the sensors 304 may be mounted to measure properties around an exterior of the vehicle 100. Additionally or alternatively, one or more of the sensors 304 may be mounted inside a cabin of the vehicle 100 or in a body of the vehicle 100 (e.g., an engine compartment, wheel wells, etc.) to measure properties in an interior of the vehicle 100. For example, the sensors 304 include accelerometers, odometers, tachometers, pitch and yaw sensors, wheel speed sensors, microphones, tire pressure sensors, biometric sensors and/or sensors of any other suitable type. In the illustrated example, the sensors 304 include a radar sensor 314, a lidar sensor 316, the accelerometer 112, and the vehicle speed sensor 114. The radar sensor 314 and/or the lidar sensor 316 may be the sensor 108 of FIG. 1. For example, the radar sensor 314 detects and locates the object 102 via radio waves, and the lidar sensor 316 detects and locates the object 102 via lasers.

The ECUs 306 monitor and control the subsystems of the vehicle 100. For example, the ECUs 306 are discrete sets of electronics that include their own circuit(s) (e.g., integrated circuits, microprocessors, memory, storage, etc.) and firmware, sensors, actuators, and/or mounting hardware. The ECUs 306 communicate and exchange information via a vehicle data bus (e.g., the vehicle data bus 308). Additionally, the ECUs 306 may communicate properties (e.g., status of the ECUs 306, sensor readings, control state, error and diagnostic codes, etc.) to and/or receive requests from each other. For example, the vehicle 100 may have seventy or more of the ECUs 306 that are positioned in various locations around the vehicle 100 and are communicatively coupled by the vehicle data bus 308. In the illustrated example, the ECUs 306 include a brake control module 318, an engine control unit 320, and a body control module 322. For example, the brake control module 318 receives a signal from the vehicle decelerator 208 of the autonomous cruise controller 120 and/or a brake pedal to decelerate the vehicle 100 and sends a signal to the brake pump 118 of the brake system 200 to decelerate the vehicle 100 at the target deceleration. Further, the engine control unit 320 operates and/or controls performance (e.g., acceleration) of an engine of the vehicle 100. The body control module 322 controls one or more subsystems throughout the vehicle 100, such as power windows, power locks, an immobilizer system, power mirrors, etc. For example, the body control module 322 includes circuits that drive one or more of relays (e.g., to control wiper fluid, etc.), brushed direct current (DC) motors (e.g., to control power seats, power locks, power windows, wipers, etc.), stepper motors, LEDs, etc.

The vehicle data bus 308 communicatively couples the camera 110, the cruise control switch 116, the on-board computing platform 302, the sensors 304, and the ECUs 306. In some examples, the vehicle data bus 308 includes one or more data buses. The vehicle data bus 308 may be implemented in accordance with a controller area network (CAN) bus protocol as defined by International Standards Organization (150) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
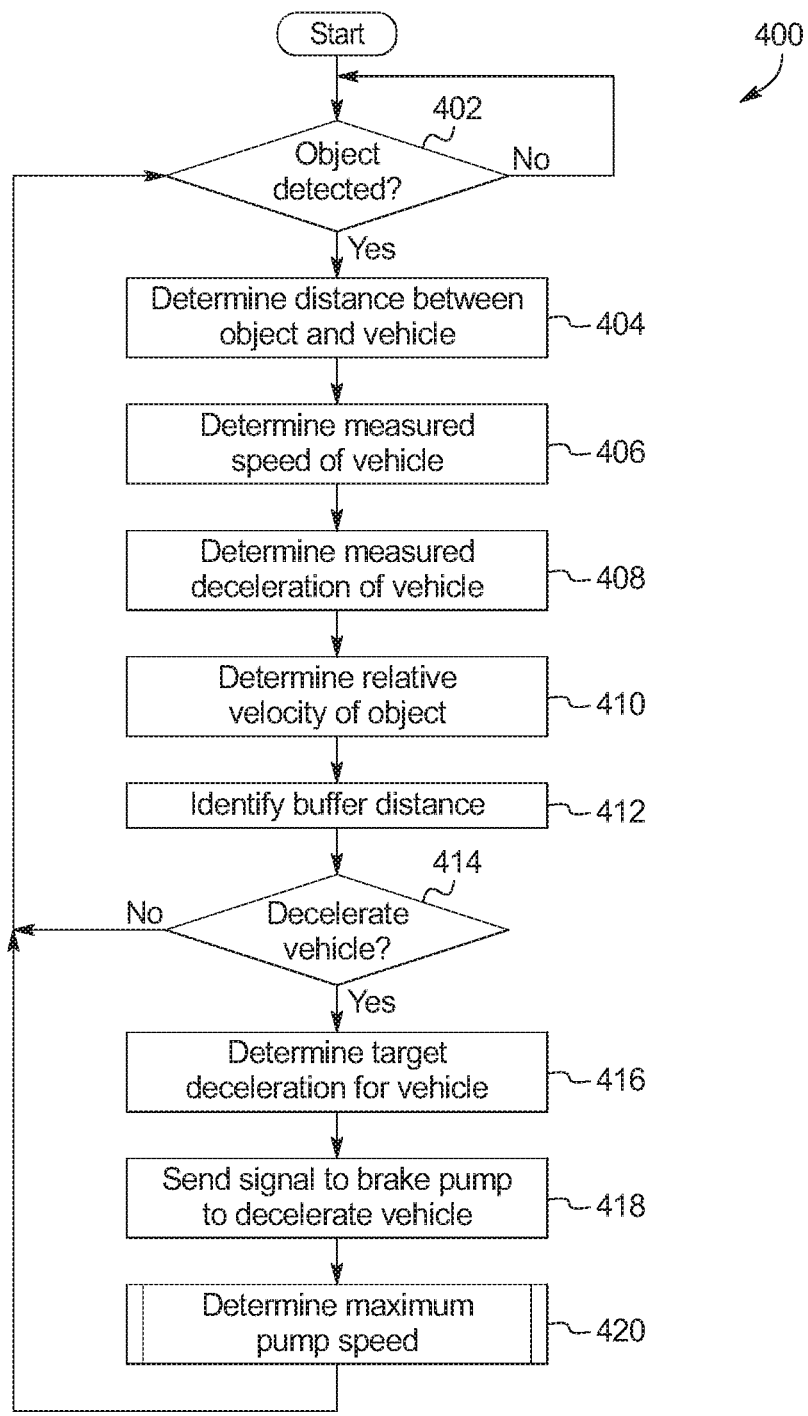
FIG. 4 is a flowchart of an example method to decelerate the vehicle of FIGS. 1A-1B via the autonomous cruise controller of FIG. 2.

FIG. 4 is a flowchart of an example method 400 to decelerate a vehicle via an autonomous cruise controller. The flowchart of FIG. 4 is representative of machine readable instructions that are stored in memory (such as the memory 312 of FIG. 3) and include one or more programs which, when executed by a processor (such as the processor 310 of FIG. 3), cause the vehicle 100 to implement the example vehicle decelerator 208 of FIG. 2, the example maximum speed regulator 210 of FIG. 2 and/or, more generally, the example autonomous cruise controller 120 of FIGS. 1-3. While the example program is described with reference to the flowchart illustrated in FIG. 4, many other methods of implementing the example vehicle decelerator 208, the example maximum speed regulator and/or, more generally, the example autonomous cruise controller 120 may alternatively be used. For example, the order of execution of the blocks may be rearranged, changed, eliminated, and/or combined to perform the method 400. Further, because the method 400 is disclosed in connection with the components of FIGS. 1-3, some functions of those components will not be described in detail below.

Initially, at block 402, the autonomous cruise controller 120 determines whether an object (e.g., the object 102) is detected to be in front of the vehicle 100 (e.g., via a second sensor). For example, the autonomous cruise controller 120 determines whether the sensor 108 (e.g., the radar sensor 314, the lidar sensor 316, an ultrasonic sensor), the camera 110, and/or any other sensor of the vehicle 100 has detected the presence of the object 102 in front of the vehicle 100. If an object is not detected, the method 400 remains at block 402 until an object is detected. If an object is detected, the method 400 proceeds to block 404.

At block 404, the vehicle decelerator 208 of the autonomous cruise controller 120 determines a distance (e.g., the first distance 104) between the vehicle 100 and the object 102 detected at block 402. For example, the vehicle decelerator 208 determines the distance between the vehicle 100 and the object 102 based on the relative object location 216 collected from the sensor 108 and/or the camera 110. In such examples, the sensor 108 and/or the camera 110 collects the relative object location 216 to identify the location of the object 102 relative to the vehicle 100 and sends the relative object location 216 to the vehicle decelerator 208.

At block 406, the vehicle decelerator 208 determines the measured speed 212 of the vehicle 100. For example, the vehicle speed sensor 114 measures the measured speed 212 of the vehicle 100, and the vehicle decelerator 208 collects the measured speed 212 from the vehicle speed sensor 114. At block 408, the vehicle decelerator 208 determines the measured deceleration 214 or measured acceleration of the vehicle 100 (e.g., via a first sensor). In some examples, the accelerometer 112 measures the measured deceleration 214 of the vehicle 100, and the vehicle decelerator 208 collects the measured deceleration 214 from the accelerometer 112. In other examples, the vehicle decelerator 208 determines the measured deceleration 214 based on the measured speed 212 that is collected from the vehicle speed sensor 114.

At block 410, the vehicle decelerator 208 determines a relative velocity of the object 102 relative to the vehicle 100. For example, the vehicle decelerator 208 determines the relative velocity based on the measured speed 212 of the vehicle 100 and the relative object location 216 of the object 102. Further, the vehicle decelerator 208 may determine a relative acceleration between the object 102 and the vehicle 100 based on the measured speed 212 of the vehicle 100 and the relative object location 216 of the object 102.

At block 412, the vehicle decelerator 208 determines the buffer distance 106 between the vehicle 100 and the object 102 that enables the vehicle 100 to safely travel behind the object 102. For example, the vehicle decelerator 208 determines the buffer distance 106 based on the measured speed 212 of the vehicle 100, the measured deceleration 214 of the vehicle 100, structural characteristics of the vehicle 100 (e.g., size, weight, etc.), the velocity of the object 102 relative to the vehicle 100, the acceleration of the object 102 relative to the vehicle 100, and/or current weather conditions.

At block 414, the vehicle decelerator 208 determines whether to decelerate the vehicle 100. That is, the vehicle decelerator 208 determines to decelerate the vehicle 100 to maintain the buffer distance 106 between the vehicle 100 and the object 102. For example, the vehicle decelerator 208 determines to decelerate the vehicle 100 if the vehicle 100 is within the buffer distance 106 and/or will be within the buffer distance 106 without decelerating. The vehicle decelerator 208 may predict whether the vehicle 100 will be within the buffer distance 106 based on the measured speed 212 of the vehicle 100, the measured deceleration 214 of the vehicle 100, the velocity of the object 102 relative to the vehicle 100, and/or the acceleration of the object 102 relative to the vehicle 100. In response to the vehicle decelerator 208 determining that the vehicle 100 is not to decelerate, the method 400 returns to block 402. Otherwise, in response to the vehicle decelerator 208 determining that the vehicle 100 is to decelerate, the method 400 proceeds to block 416.

At block 416, the vehicle decelerator 208 determines the target deceleration for the vehicle 100. For example, the vehicle decelerator 208 determines the target deceleration based on the distance between the vehicle 100 and the object 102, the measured speed 212 of the vehicle 100, the measured deceleration 214 of the vehicle 100, the relative velocity of the object 102 relative to the vehicle 100, the relative acceleration of the object 102 relative to the vehicle 100, and/or current weather conditions. At block 418, the vehicle decelerator 208 sends a signal to the brake pump 118 of the brake system 200 to decelerate the vehicle 100 at the target deceleration. Upon receiving the signal, the brake pump 118 generates hydraulic pressure that is provided to the wheel brakes 206 via the brake lines 202 to decelerate the vehicle 100.

At block 418, the maximum speed regulator 210 of the autonomous cruise controller 120 determines the maximum pump speed for the brake pump 118. For example, the maximum speed regulator 210 determines whether to adjust the maximum pump speed based on a rate of change of the target deceleration over time and/or based on a difference between the measured deceleration 214 and the target deceleration. Upon determining the maximum speed regulator 210 determining the maximum pump speed, the method 400 returns to block 402.

Figure 5:
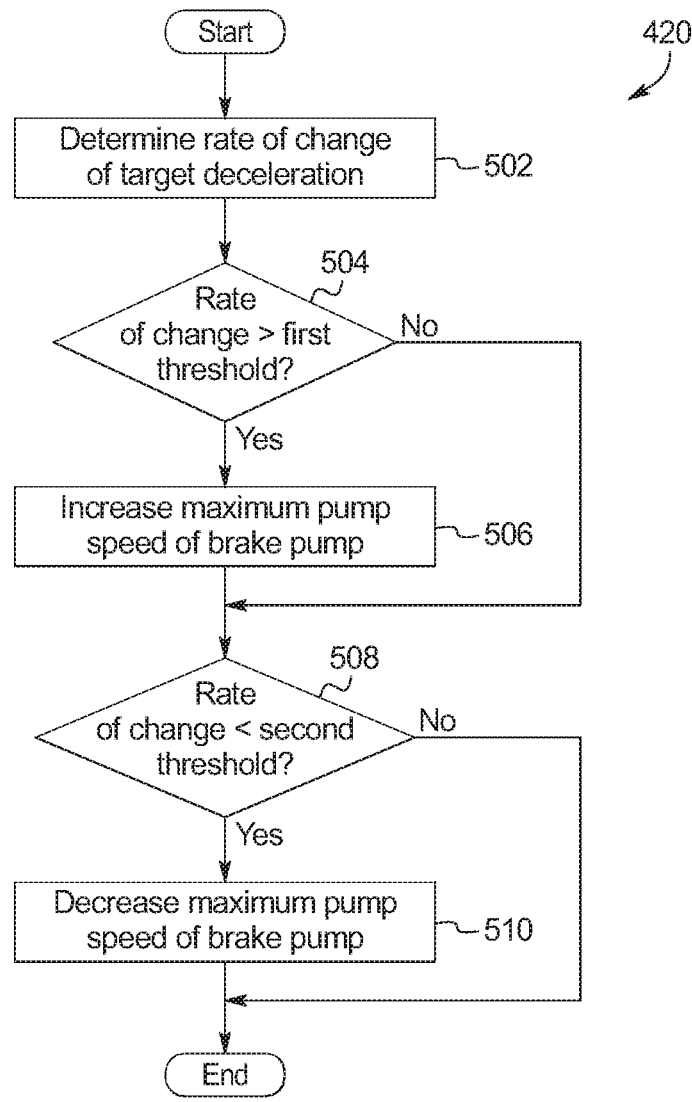
FIG. 5 is a flowchart of an example method to adjust a maximum speed of a brake pump of the braking system of FIG. 2.

FIG. 5 is a flowchart of an example method to implement block 420 to adjust a maximum speed of a brake pump of a vehicle braking system based on a rate of change of a target deceleration. The flowchart of FIG. 5 is representative of machine readable instructions that are stored in memory (such as the memory 312 of FIG. 3) and include one or more programs which, when executed by a processor (such as the processor 310 of FIG. 3), cause the vehicle 100 to implement the example maximum speed regulator 210 of FIG. 2. While the example program is described with reference to the flowchart illustrated in FIG. 5, many other methods of implementing the example maximum speed regulator 210 may alternatively be used. For example, the order of execution of the blocks of FIG. 5 may be rearranged, changed, eliminated, and/or combined to perform the method to implement block 420. Further, because the method of FIG. 5 to implement block 420 is disclosed in connection with the components of FIGS. 1-3, some functions of those components will not be described in detail below.

Initially, to determine the maximum pump speed based on the rate of change of the target deceleration, the maximum speed regulator 210 determines the rate of change of the target deceleration at block 502. For example, the maximum speed regulator 210 determines a first target deceleration at a first point-in-time, determines a second target deceleration at a second point-in-time different than the first point-in-time, and subsequently determines the rate of change between the first target deceleration and the second target deceleration.

At block 504, the maximum speed regulator 210 compares the rate of change to a first threshold (e.g., a predetermined threshold). In response to the maximum speed regulator 210 determining that the rate of change is greater than the first threshold, the method of FIG. 5 proceeds to block 506 at which the maximum speed regulator 210 increases the maximum pump speed. For example, the maximum speed regulator 210 increases the maximum pump speed by a first predetermined value based on a difference between the rate of change and the first threshold. In other examples, the maximum speed regulator 210 increases the maximum pump speed in response to detecting an increase in the rate of change of the target deceleration. Upon the maximum speed regulator 210 increasing the maximum pump speed at block 506 or in response to the maximum speed regulator 210 determining that the rate of change is not greater than the first threshold, the method of FIG. 5 proceeds to block 508.

At block 508, the maximum speed regulator 210 compares the rate of change to a second threshold (e.g., a predetermined threshold). In response to determining that the rate of change is less than the second threshold, the method of FIG. 5 proceeds to block 510 at which the maximum speed regulator 210 decreases the maximum pump speed. For example, the maximum speed regulator 210 decreases the maximum pump speed by a second predetermined value based on a difference between the rate of change and the second threshold. In other examples, the maximum speed regulator 210 decreases the maximum pump speed in response to detecting a decrease in the rate of change of the target deceleration. Upon the maximum speed regulator 210 decreasing the maximum pump speed at block 510 or in response to the maximum speed regulator 210 determining that the rate of change is not less than the second threshold, the method of FIG. 5 ends.

Figure 6:
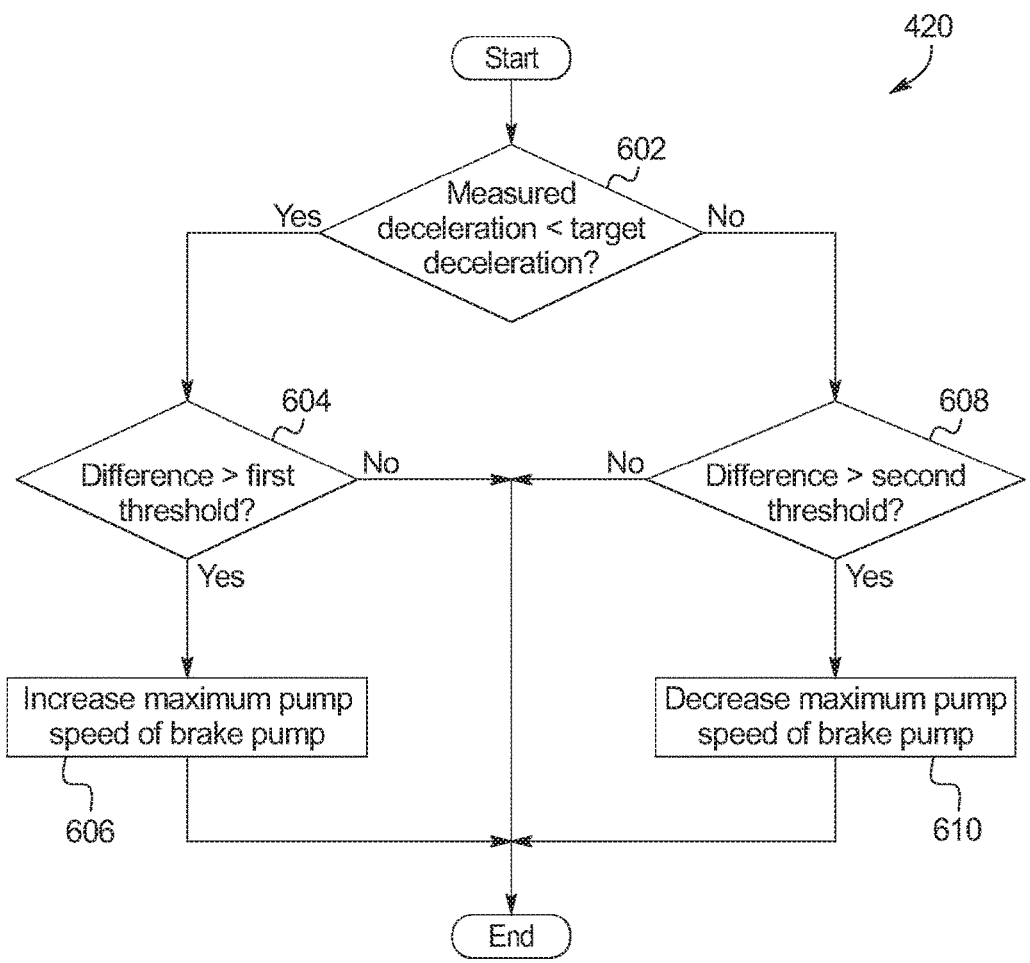
FIG. 6 is a flowchart of another example method to adjust the maximum speed of the brake pump of the braking system of FIG. 2.

FIG. 6 is a flowchart of another example method to implement block 420 to adjust a maximum speed of a brake pump of a vehicle braking system based on a difference between a target deceleration and a measured deceleration. The flowchart of FIG. 6 is representative of machine readable instructions that are stored in memory (such as the memory 312 of FIG. 3) and include one or more programs which, when executed by a processor (such as the processor 310 of FIG. 3), cause the vehicle 100 to implement the example maximum speed regulator 210 of FIG. 2. While the example program is described with reference to the flowchart illustrated in FIG. 6, many other methods of implementing the example maximum speed regulator 210 may alternatively be used. For example, the order of execution of the blocks of FIG. 6 may be rearranged, changed, eliminated, and/or combined to perform the method to implement block 420. Further, because the method of FIG. 6 to implement block 420 is disclosed in connection with the components of FIGS. 1-3, some functions of those components will not be described in detail below.

Initially, to determine the maximum pump speed based on a difference between the measured deceleration 214 and the target deceleration, the maximum speed regulator 210 compares the measured deceleration 214 to the target deceleration.

In response to the maximum speed regulator 210 determining that the measured deceleration 214 is less than the target deceleration, the method of FIG. 6 proceeds to block 604 at which the maximum speed regulator 210 determines a difference between the measured deceleration 214 and the target deceleration and subsequently compares the difference to a first threshold (e.g., a predetermined threshold). In response to determining that the difference is greater than the first threshold, the method of FIG. 5 proceeds to block 606 at which the maximum speed regulator 210 increases the maximum pump speed. For example, the maximum speed regulator 210 increases the maximum pump speed by a first predetermined value based on a difference between first threshold and the difference between the measured deceleration 214 and the target deceleration. Upon the maximum speed regulator 210 increasing the maximum pump speed at block 606 or in response to the maximum speed regulator 210 determining that the difference is less than or equal to the first threshold, the method of FIG. 5 ends.

Otherwise, in response to the maximum speed regulator 210 determining that the measured deceleration 214 is greater than or equal to the target deceleration at block 602, the method of FIG. 6 proceeds to block 608 at which the maximum speed regulator 210 determines a difference between the measured deceleration 214 and the target deceleration and subsequently compares the difference to a second threshold (e.g., a predetermined threshold). In response to determining that the difference is greater than the second threshold, the method of FIG. 6 proceeds to block 610 at which the maximum speed regulator 210 decreases the maximum pump speed. For example, the maximum speed regulator 210 decreases the maximum pump speed by a second predetermined value based on a difference between second threshold and the difference between the measured deceleration 214 and the target deceleration. Upon the maximum speed regulator 210 decreasing the maximum pump speed at block 610 or in response to the maximum speed regulator 210 determining that the difference is less than or equal to the second threshold, the method of FIG. 6 ends.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a brake pump having a maximum pump speed;
   a vehicle decelerator to:
      determine a target deceleration for autonomous deceleration; and
      send a signal to the brake pump to decelerate the vehicle at the target deceleration; and
   a maximum speed regulator to:
      determine a rate of change of the target deceleration; and
      adjust the maximum pump speed based on the rate of change by:
         increasing the maximum pump speed in response to determining the rate of change of the target deceleration is greater than a first threshold,
         decreasing the maximum pump speed in response to determining the rate of change of the target deceleration is less than a second threshold, the first threshold being greater than the second threshold, and
         maintaining the maximum pump speed in response to determining the rate of change of the target deceleration is between the first threshold and the second threshold.

2. The vehicle of claim 1, wherein the brake pump surges to the maximum pump speed upon receiving the signal from the vehicle decelerator to decelerate the vehicle at the target deceleration.

3. The vehicle of claim 1, further including a sensor to detect an object in front of the vehicle, the brake pump decelerates the vehicle to maintain a buffer distance between the vehicle and the object.

4. The vehicle of claim 3, wherein the vehicle decelerator determines the buffer distance based on a speed of the vehicle.

5. The vehicle of claim 4, further including a vehicle speed sensor to determine the speed of the vehicle.

6. The vehicle of claim 3, wherein the vehicle decelerator determines the target deceleration based on a distance between the vehicle and the object, a relative velocity between the vehicle and the object, and an acceleration of the vehicle.

7. The vehicle of claim 6, wherein the vehicle decelerator determines the distance and the relative velocity between the object and the vehicle via the sensor.

8. A method for autonomous deceleration of a vehicle, the method comprising:

determining, via a processor, a target deceleration for the vehicle;

sending a signal to a brake pump to decelerate the vehicle at the target deceleration, the brake pump having a maximum pump speed;

determining a rate of change of the target deceleration; and adjusting the maximum pump speed based on the rate of change by:
- increasing the maximum pump speed in response to determining the rate of change of the target deceleration is greater than a first threshold,
- decreasing the maximum pump speed in response to determining the rate of change of the target deceleration is less than a second threshold, the second threshold being less than the first threshold, and
- maintaining the maximum pump speed in response to determining the rate of change of the target deceleration is between the first threshold and the second threshold.

9. The method of claim 8, further including:
detecting, via a sensor, an object in front of the vehicle; and
determining the target deceleration to maintain a buffer distance between the vehicle and the object.

10. The method of claim 8, wherein adjusting the maximum pump speed of the brake pump further includes increasing the maximum pump speed in response to detecting an increase of the rate of change of the target deceleration.

11. The method of claim 10, wherein adjusting the maximum pump speed of the brake pump further includes decreasing the maximum pump speed in response to detecting a decrease of the rate of change of the target deceleration.

12. The method of claim 8, wherein the maximum pump speed is increased based on a difference between the rate of change and the first threshold.

13. The method of claim 8, wherein the maximum pump speed is decreased based on a difference between the rate of change and the second threshold.

14. A vehicle comprising:
a brake pump having a maximum pump speed (MPS); and
a controller to:
- instruct the brake pump to decelerate the vehicle at a target deceleration;
- determine a rate of change (ROC) of the target deceleration; and
- responsive to determining:
  - the ROC exceeds a first threshold, increase the MPS;
  - the ROC is less than a second threshold, decrease the MPS; and
  - the ROC is between the first and second thresholds, maintain the MPS.

* * * * *